(12) United States Patent
Mook et al.

(10) Patent No.: US 10,704,600 B2
(45) Date of Patent: **\*Jul. 7, 2020**

(54) BEARING

(71) Applicant: General Electric Company, Schenectady, NY (US)

(72) Inventors: Joshua Tyler Mook, Loveland, OH (US); Bugra Han Ertas, Niskayuna, NY (US); Jason Joseph Bellardi, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,804

(22) Filed: Mar. 19, 2018

(65) Prior Publication Data

US 2018/0209479 A1 Jul. 26, 2018

Related U.S. Application Data

(63) Continuation of application No. 15/131,136, filed on Apr. 18, 2016, now Pat. No. 9,951,811.

(51) Int. Cl.
*F16C 33/10* (2006.01)
*F16C 17/02* (2006.01)
(Continued)

(52) U.S. Cl.
CPC ........ *F16C 33/1015* (2013.01); *F01D 25/164* (2013.01); *F01D 25/166* (2013.01);
(Continued)

(58) Field of Classification Search
CPC ...... F16C 17/02; F16C 27/02; F16C 32/0622; F16C 32/0625; F16C 33/1015;
(Continued)

(56) References Cited

U.S. PATENT DOCUMENTS 2,972,504 A 2/1961 Baker
3,004,804 A 10/1961 Pinkus et al.
(Continued)

FOREIGN PATENT DOCUMENTS

CH 550340 A 6/1974
GB 800 299 A 8/1958
(Continued)

OTHER PUBLICATIONS

Gunter et al., "Design of Nonlinear Squeeze-Film Dampers for Aircraft Engines", Journal of Lubrication Technology, vol. No. 99, Issue No. 01, pp. 57-64, Mar. 10, 1976.
(Continued)

*Primary Examiner* — Marcus Charles
(74) *Attorney, Agent, or Firm* — Dinsmore & Shohl LLP

(57) ABSTRACT

A bearing includes a bearing pad for supporting a rotary component and a housing attached to or formed integrally with the bearing pad. The housing includes a flexible column extending towards the bearing pad for providing the bearing pad with an airflow. The column supports the bearing pad from a location inward of an outer periphery of the bearing pad along an axial direction of the bearing. With such a configuration, a resistance of the bearing pad along a radial direction of the bearing is less at the outer periphery than a resistance of the bearing pad along the radial direction proximate the column.

20 Claims, 8 Drawing Sheets

(51) Int. Cl.
  F01D 25/16    (2006.01)
  F16C 32/06    (2006.01)
  F16C 33/04    (2006.01)
  F16F 15/00    (2006.01)
  F16C 17/03    (2006.01)
  F16C 43/02    (2006.01)
  F16F 15/023   (2006.01)
  F16C 27/02    (2006.01)

(52) U.S. Cl.
  CPC .......... *F16C 17/02* (2013.01); *F16C 17/035* (2013.01); *F16C 27/02* (2013.01); *F16C 32/0622* (2013.01); *F16C 32/0625* (2013.01); *F16C 32/0666* (2013.01); *F16C 32/0677* (2013.01); *F16C 33/043* (2013.01); *F16C 33/1005* (2013.01); *F16C 43/02* (2013.01); *F16F 15/00* (2013.01); *F16F 15/0237* (2013.01); *F16C 2360/23* (2013.01); *Y02T 50/671* (2013.01)

(58) Field of Classification Search
  CPC .... F16C 43/02; F16C 2360/23; F16C 17/035; F16C 32/0666; F16C 32/0677; F16C 33/043; F16C 33/1005; F01D 25/164; F01D 25/166; F16F 15/00; Y02T 50/671
  USPC .......... 384/99, 103, 106, 109, 114, 117–119, 384/129, 312; 267/113, 118, 140.11; 494/82–83
  See application file for complete search history.

(56) References Cited

U.S. PATENT DOCUMENTS

| | | | |
|---|---|---|---|
| 3,110,526 A | 11/1963 | Sternlicht | |
| 3,351,394 A | 11/1967 | Hooker | |
| 3,620,581 A | 11/1971 | Heller et al. | |
| 3,721,479 A | 3/1973 | Rasnick et al. | |
| 3,863,996 A | 2/1975 | Raimondi | |
| 3,891,281 A | 6/1975 | Jenness | |
| 3,944,304 A | 3/1976 | Purtschert | |
| 3,994,541 A | 11/1976 | Geary et al. | |
| 4,132,218 A * | 1/1979 | Bennett ................ | E06B 3/6612 126/704 |
| 4,262,975 A | 4/1981 | Heshmat et al. | |
| 4,410,220 A | 10/1983 | Robinson | |
| 4,632,574 A | 12/1986 | Wilson et al. | |
| 4,743,125 A | 5/1988 | Dammel et al. | |
| 4,793,722 A | 12/1988 | Jensen | |
| 4,872,767 A | 10/1989 | Knapp | |
| 4,921,229 A | 5/1990 | Hori | |
| 4,971,458 A | 11/1990 | Carlson | |
| 5,044,781 A | 9/1991 | Werner | |
| 5,085,521 A | 2/1992 | Sigh | |
| 5,149,206 A | 9/1992 | Bobo | |
| 5,222,815 A | 6/1993 | Ide | |
| 5,328,408 A | 7/1994 | Wolf et al. | |
| 5,360,273 A | 11/1994 | Buckmann | |
| 5,374,129 A | 12/1994 | Vohr et al. | |
| 5,380,100 A | 1/1995 | Yu | |
| 5,421,655 A | 6/1995 | Ide et al. | |
| 5,501,531 A | 3/1996 | Hamaekers | |
| 5,603,574 A | 2/1997 | Ide et al. | |
| 5,743,654 A | 4/1998 | Ide et al. | |
| 6,019,515 A | 2/2000 | Fujii et al. | |
| 6,169,332 B1 | 1/2001 | Taylor et al. | |
| 6,308,810 B1 | 10/2001 | Kuwayama | |
| 6,536,565 B2 | 3/2003 | Oliver et al. | |
| 6,679,045 B2 | 1/2004 | Karafillis et al. | |
| 6,700,747 B2 | 3/2004 | Matz | |
| 6,883,967 B2 | 4/2005 | Robb et al. | |
| 7,290,931 B2 | 11/2007 | Wardman et al. | |
| 7,394,076 B2 | 7/2008 | Devitt | |
| 7,431,504 B1 | 10/2008 | Pelfrey | |
| 7,517,152 B1 | 4/2009 | Walsh | |
| 7,607,647 B2 | 10/2009 | Zhao et al. | |
| 7,625,121 B2 | 12/2009 | Pettinato et al. | |
| 7,628,542 B2 | 12/2009 | Wada et al. | |
| 7,896,550 B1 | 3/2011 | Pinera et al. | |
| 7,987,599 B2 | 8/2011 | Mavrosakis | |
| 8,083,413 B2 | 12/2011 | Ertas | |
| 8,118,570 B2 | 2/2012 | Meacham et al. | |
| 8,146,369 B2 | 4/2012 | Walitzki et al. | |
| 8,206,039 B2 | 6/2012 | Maier | |
| 8,209,834 B2 | 7/2012 | Mons et al. | |
| 8,240,919 B2 * | 8/2012 | Hirata .................... | F16C 13/04 384/100 |
| 8,256,750 B2 | 9/2012 | Cottrell et al. | |
| 8,272,786 B2 | 9/2012 | Cottrell | |
| 8,342,796 B2 | 1/2013 | Spencer et al. | |
| 8,591,117 B2 | 11/2013 | Giraud et al. | |
| 8,720,205 B2 | 5/2014 | Lugg | |
| 8,796,893 B2 | 8/2014 | Muth | |
| 8,814,437 B2 | 8/2014 | Braun | |
| 8,834,027 B2 | 9/2014 | Zeidan | |
| 8,998,492 B2 | 4/2015 | Bertea | |
| 9,046,001 B2 | 6/2015 | Hindle et al. | |
| 9,121,448 B2 | 9/2015 | Delgado Marquez et al. | |
| 9,169,846 B2 | 10/2015 | Mariotti et al. | |
| 9,297,438 B2 | 3/2016 | Meacham et al. | |
| 9,416,820 B2 | 8/2016 | Ertas et al. | |
| 9,746,029 B1 | 8/2017 | Mook et al. | |
| 10,001,166 B2 | 6/2018 | Ertas et al. | |
| 10,036,279 B2 | 7/2018 | Ertas et al. | |
| 2005/0008269 A1 | 1/2005 | Akutsu et al. | |
| 2006/0054660 A1 | 3/2006 | Chappell | |
| 2013/0216174 A1 | 8/2013 | Braun | |
| 2014/0140645 A1 | 5/2014 | Meacham et al. | |
| 2014/0154058 A1 | 6/2014 | Meacham et al. | |
| 2014/0286599 A1 | 9/2014 | Devitt et al. | |
| 2015/0104123 A1 | 4/2015 | Ertas et al. | |
| 2015/0275967 A1 | 10/2015 | Ryu | |
| 2017/0298752 A1 | 10/2017 | Mook et al. | |
| 2017/0298765 A1 | 10/2017 | Ertas et al. | |
| 2017/0298772 A1 | 10/2017 | Mook et al. | |
| 2017/0298830 A1 | 10/2017 | Ertas et al. | |

FOREIGN PATENT DOCUMENTS

| | | | | |
|---|---|---|---|---|
| JP | 2000283153 A | * | 10/2000 | ............. F16C 17/03 |
| JP | 2001050267 A | | 2/2001 | |
| JP | 2009030704 A | | 2/2009 | |
| JP | 2012092969 A | | 5/2012 | |
| WO | 2016/085673 A1 | | 6/2016 | |

OTHER PUBLICATIONS

Heshmat et al., "Analysis of Gas-Lubricated Foil Journal Bearings", Journal of Lubrication Technology, vol. No. 105, Issue No. 4, pp. 647-655, Oct. 1, 1983.

Agrawal, "Foil Air/Gas Bearing Technology—An Overview", Microturbines and Small Turbomachinery, ASME International Gas Turbine and Aeroengine Congress and Exhibition, Orlando, Florida, USA, Paper No. 97-GT-347, 11 pages, Jun. 2-5, 1997.

U.S. Non-Final Office Action issued in connection with related U.S. Appl. No. 15/131,113 dated Nov. 17, 2016.

Dellacorte et al., "Load Capacity Estimation of Foil Air Journal Bearings for Oil-Free Turbomachinery Applications", Tribology Transactions, Taylor & Francis Online, vol. No. 43, Issue No. 4, 2000.

Andres, "Hybrid Flexure Pivot-Tilting Pad Gas Bearings: Analysis and Experimental Validation", Journal of Tribology, ASME, vol. No. 128, Issue No. 3, 551-558, Mar. 1, 2006.

Gu et al., "Laser additive manufacturing of metallic components: materials, processes and mechanisms", International Materials Reviews, Maney Online, vol. No. 57, Issue No 3, pp. 133-164, May 2012.

U.S. Notice of Allowance issued in connection with related U.S. Appl. No. 14/566,798 dated Apr. 26, 2016.

European Search Report and Opinion Issued in connection with related EP Application No. 17165709.1 dated May 31, 2017.

(56) References Cited

OTHER PUBLICATIONS

U.S. Non-Final Office Action Issued in connection with related U.S. Appl. No. 15/131,081 dated Jun. 13, 2017.
Office Action issued in connection with corresponding EP Application No. 17165705.9 dated Jul. 27, 2018.

* cited by examiner

BEARING

CROSS-REFERENCE TO RELATED APPLICATION

The application is a continuation of U.S. application Ser. No. 15/131,136, filed on Apr. 18, 2016 and entitled BEARING, which is hereby expressly incorporated herein by reference in its entirety.

FIELD OF THE INVENTION

The present subject matter relates generally to a bearing, or more particularly to an air bearing that may be used in a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressors, turbines, couplings, sealing packs, and other elements required for optimal operation under given operating conditions. These rotor assemblies have a mass generating a constant static force due to gravity, and also generate a dynamic force due, e.g., to imbalances in the rotor assembly during operation. Such gas turbine engines include bearings to sustain and support these forces while permitting rotation of the rotor assembly.

At least some known rotary machines use gas bearings where non-oil lubricated bearings are desired. However, typical gas bearings are supported at an outer periphery of the bearing pads due to the conventional inwardly-positioned dampener assemblies. Such a configuration may make it difficult for the gas bearings to accommodate any misalignment of a rotary component of the rotor assemblies, as a point or line force is created between the bearing pad and rotary component due to such misalignment.

Therefore, a gas bearing capable of accommodating a misalignment of a rotary component of a rotor assembly would be useful. More particularly, a gas bearing capable of supporting a misaligned rotary component of a rotor assembly without generating a substantial point force or line force would be especially beneficial.

SUMMARY OF THE INVENTION

Aspects and advantages of the invention will be set forth in part in the following description, or may be obvious from the description, or may be learned through practice of the invention.

In one exemplary embodiment of the present disclosure, a bearing is provided defining an axial direction and a radial direction. The bearing includes a bearing pad for supporting a rotary component and defining an outer periphery. The bearing additionally includes a housing attached to or formed integrally with the bearing pad. The housing includes a flexible column extending towards the bearing pad for providing the bearing pad with an airflow. The column supports the bearing pad from a location inward of the outer periphery of the bearing pad along the axial direction such that a resistance of the bearing pad along the radial direction at the outer periphery is less than a resistance of the bearing pad along the radial direction proximate the column.

In another exemplary embodiment of the present disclosure a bearing for a gas turbine engine having a rotary component is provided. The bearing includes a bearing pad for supporting the rotary component of the gas turbine engine and defining an outer periphery. The bearing additionally includes a housing having an inner wall attached to or formed integrally with the bearing pad. The inner wall at least partially forms a flexible column, the flexible column supporting the bearing pad from a location inward of the outer periphery of the bearing pad and defining a channel for providing the bearing pad with an airflow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
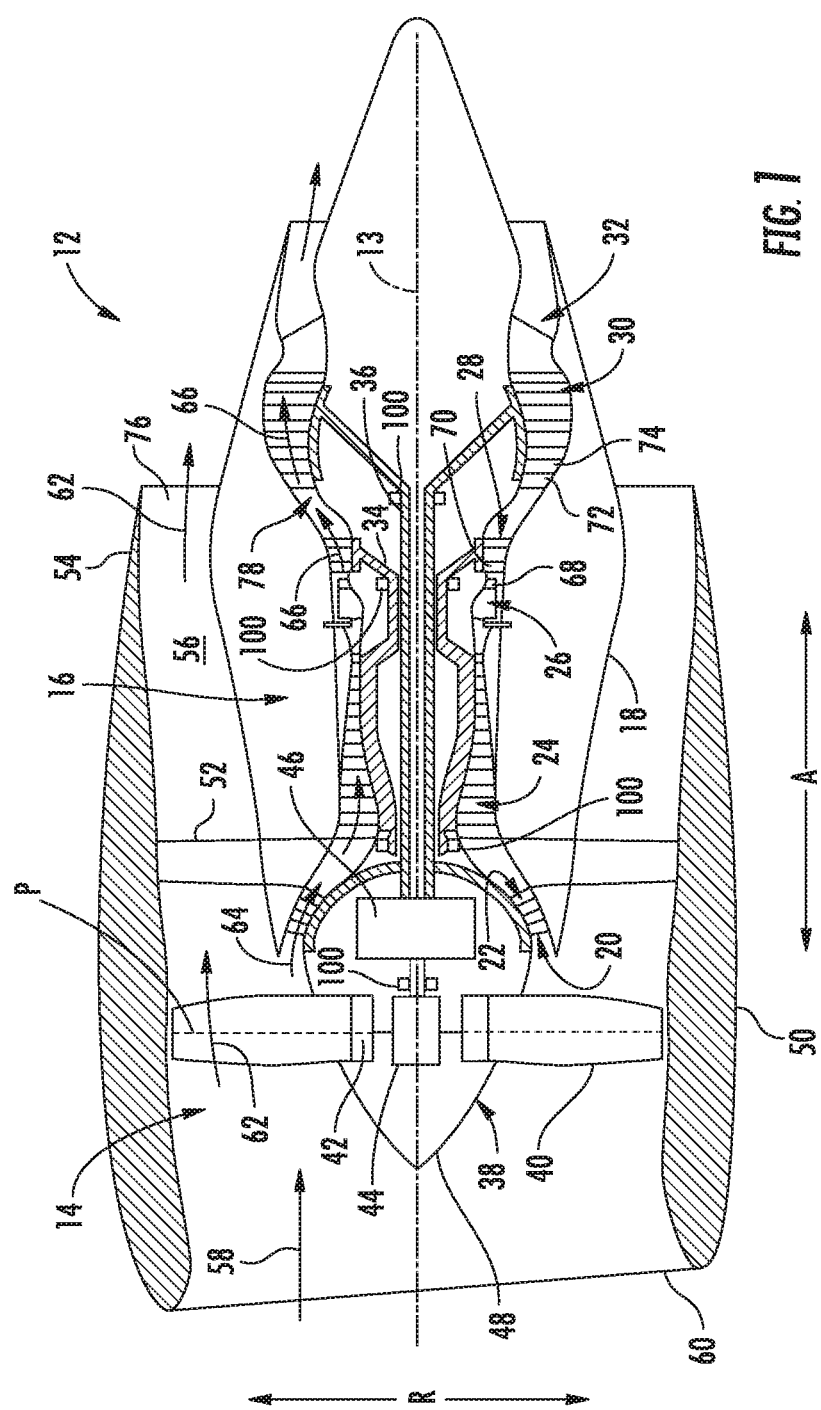
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A1 (extending parallel to a longitudinal centerline 13 provided for reference), a radial direction R1, and a circumferential direction (not shown) extending about the axial direction A1. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A1 during operation of the turbofan engine 12.

In order to support such rotary components, the turbofan engine includes a plurality of air bearings 100 attached to various structural components within the turbofan engine 12. Specifically, for the embodiment depicted the bearings 100 facilitate rotation of, e.g., the LP shaft 36 and HP shaft 34 and dampen vibrational energy imparted to bearings 100 during operation of the turbofan engine 12. Although the bearings 100 are described and illustrated as being located generally at forward and aft ends of the respective LP shaft 36 and HP shaft 34, the bearings 100 may additionally, or alternatively, be located at any desired location along the LP shaft 36 and HP shaft 34 including, but not limited to, central or mid-span regions of the shafts 34, 36, or other locations along shafts 34, 36 where the use of conventional bearings 100 would present significant design challenges. Further, bearings 100 may be used in combination with conventional oil-lubricated bearings. For example, in one embodiment, conventional oil-lubricated bearings may be located at the ends of shafts 34, 36, and one or more bearings 100 may be located along central or mid-span regions of shafts 34, 36.

Referring still to the embodiment of FIG. 1, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 12 depicted in FIG. 1 is provided by way of example only, and that in other exemplary embodiments, the turbofan engine 12 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
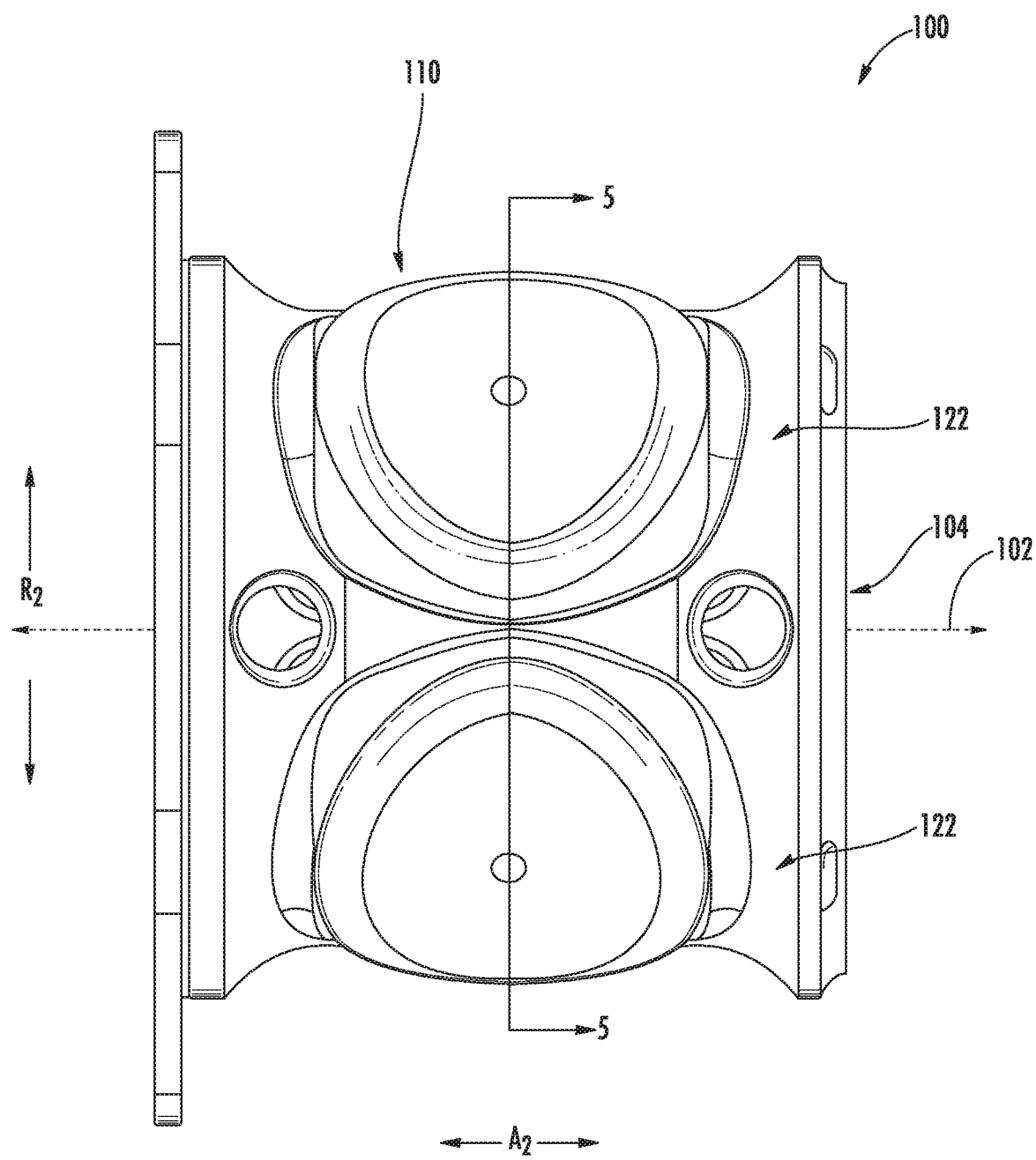
FIG. 2 is a side view of a bearing in accordance with an exemplary embodiment of the present disclosure.
Figure 3:
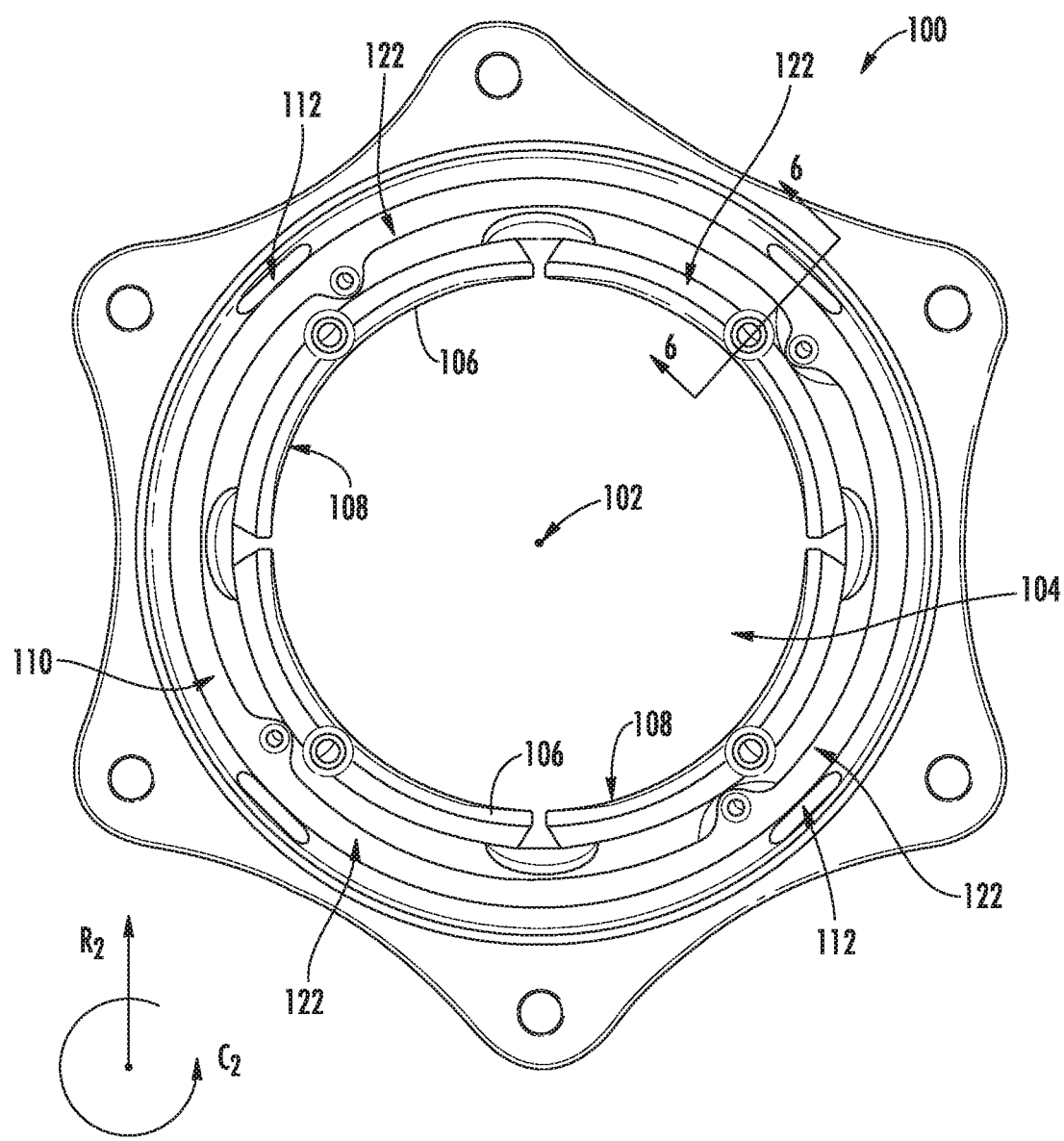
FIG. 3 is an end view of the exemplary bearing of FIG. 2.
Figure 4:
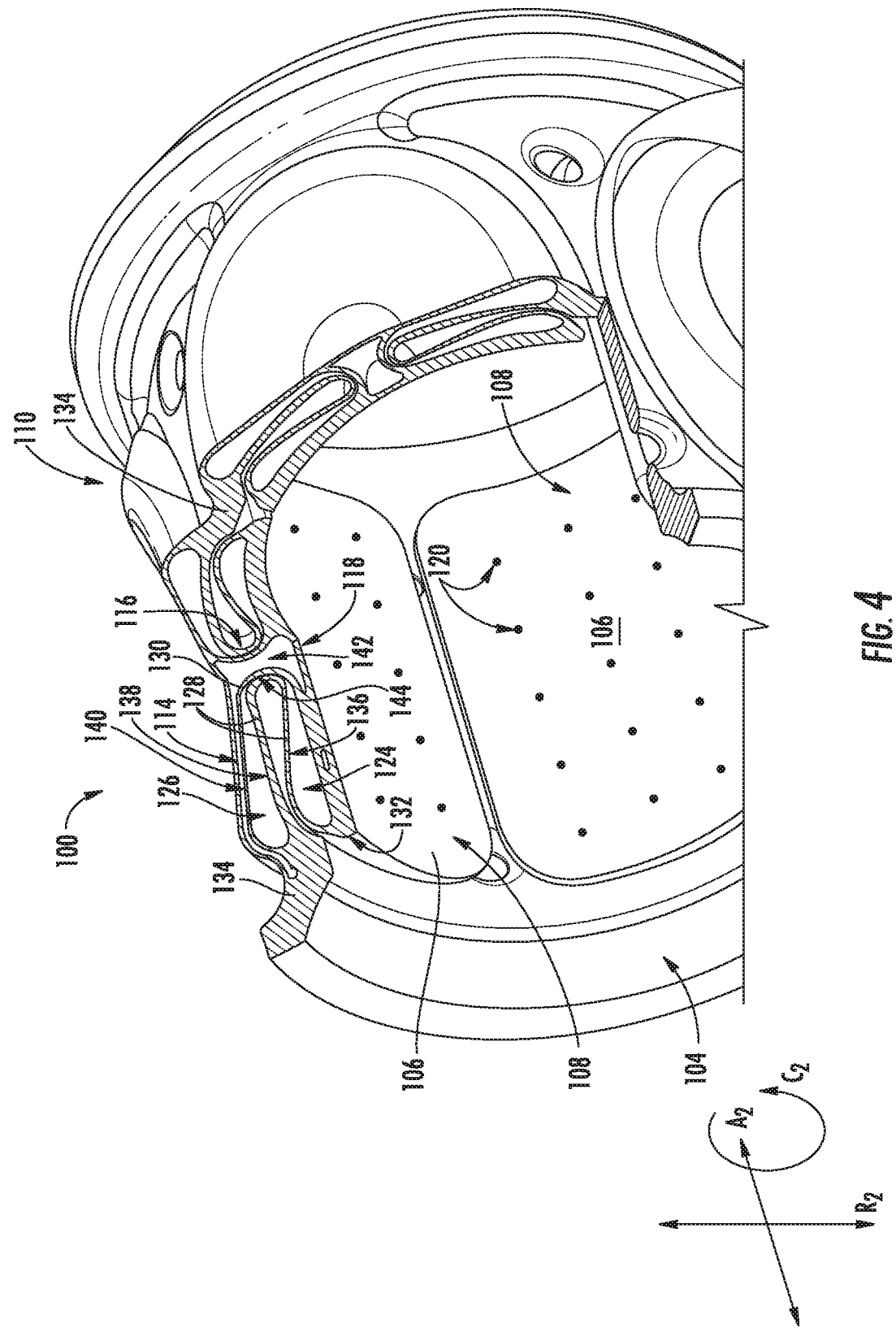
FIG. 4 is a perspective, cutaway view of the exemplary bearing of FIG. 2.

Referring now to FIGS. 2 through 4, a bearing 100 in accordance with an exemplary embodiment of the present disclosure is depicted. Specifically, FIG. 2 provides a side view of a bearing 100 in accordance with an exemplary embodiment of the present disclosure; FIG. 3 provides an end view of the exemplary bearing 100 of FIG. 2; and FIG. 4 provides a perspective, cut-away view of the exemplary bearing 100 of FIG. 2. In certain exemplary embodiments, the exemplary bearing 100 may be incorporated into the exemplary turbofan engine 12 described above with reference to FIG. 1, or alternatively, the bearing 100 may be incorporated into any other suitable gas turbine engine or turbomachine.

As shown, the exemplary bearing 100 depicted generally defines an axial direction A2 (and a central axis 102 extending generally along the axial direction A2), a radial direction R2, and a circumferential direction C2. The bearing 100 defines an axial opening 104 and is configured to support a rotary component, e.g., of the turbofan engine 12, within the axial opening 104. The bearing 100 generally includes one or more bearing pads 106, each defining an inner surface 108 for supporting the rotary component and a housing 110 attached to or formed integrally with the bearing pad 106. The bearing 100 is configured as an "air" bearing, or oil-free/oil-less bearing, and accordingly the housing 110 is generally configured to provide the inner surfaces 108 of the one or more bearing pads 106 with a flow of a working gas (e.g., air, compressed air and combustion gases, or the like) during operation to create separation with the rotary component and provide a low friction means for supporting such rotary component (not depicted).

The housing 110 of the bearing 100 includes a gas inlet 112 (FIG. 3) at a first end along the axial direction A2 and a supply channel 114 (FIG. 4) extending from the gas inlet 112 to a column 116. The column 116 is configured to provide the bearing pad 106 with a flow of the working gas from the supply channel 114, as will be discussed in greater detail below. Additionally, as is depicted, the column 116 extends towards the bearing pad 106 and supports the bearing pad 106. For the embodiment depicted, the column 116 fully supports the bearing pad 106. Further, for the embodiment depicted, the column 116 is located approximately at a center of the bearing pad 106. More particularly, the bearing pad 106 depicted defines a center 118 along the axial direction A2 and along the circumferential direction C2, and the column 116 is at least partially attached to or formed integrally with the bearing pad 106 proximate the center 118 of the bearing pad 106. However, in other embodiments, the column 116 may instead be positioned off-center from the bearing pad 106.

In certain embodiments, the bearing pad 106 may be configured to disperse and/or diffuse the working gas to support and/or lubricate the rotary component during operation of the bearing 100. In such manner, the bearing 100 may provide a hydrostatically pressurized compliant bearing pad. For example, the exemplary bearing pad 106 depicted includes plurality of gas distribution holes 120 disposed across the bearing pad 106 to provide an evenly distributed pressure field within the axial opening 104 for supporting and/or lubricating the rotary component.

The plurality of gas distribution holes 120 may be configured having any dimensions or arrangements (e.g., array, pattern or configuration) suitable to function as described herein. For example, in some embodiments, the plurality of gas distribution holes 120 may generally have a diameter in the range of between about 2 mils (about 50 micrometers) and about 100 mils (about 2,540 micrometers) and, more specifically, between about 5 mils (about 127 micrometers) and about 20 mils (about 508 micrometers). Alternatively, or in addition, in some embodiments, each bearing pad 106 may have a sufficiently high gas permeability to permit the working gas received from the column 116 to generate sufficient pressure within axial opening 104 to provide the support and/or lubrication of the rotary component.

Furthermore, as is depicted, the bearing 100 includes a plurality of sections 122 spaced along the circumferential direction C2 of the bearing 100. Each section 122 may generally include a bearing pad 106 (e.g., configured in the same manner described above) and a respective portion of the housing 110 configured as a damper assembly. Accordingly, as may be seen most clearly in, e.g., FIG. 3, the bearing 100 includes a plurality of bearing pads 106 substantially evenly spaced along the circumferential direction C2. Each of the bearing pads 106 defines a respective inner surface 108, the inner surfaces 108 of the plurality of bearing pads 106 together defining a substantially annular support surface along the circumferential direction C2 (see, e.g., FIG. 3) and a linear support surface along the axial direction A2 (see, e.g., FIG. 6, discussed below) for supporting a rotary component.

The bearing pads 106 may be fabricated from any material suitable to withstand the working conditions of the bearing 100. In addition, in some embodiments, the bearing pads 106 are fabricated form a material having a sufficiently low porosity to prevent instabilities in the thin gas film created between bearing pads 106 and the rotary component during operation of, e.g., the turbomachine. For example, in some embodiments, the bearing pads 106 may be fabricated from porous carbons, such as carbon graphite, sintered porous ceramics, and sintered porous metals, such as cobalt, nickel, or iron-based alloys.

Moreover, in some embodiments, the bearing pad 106 and housing 110 of each section 122 may be formed integrally of a single, continuous material. For example, in some embodiments, each of the bearing pads 106 may be formed integrally with the housing 110 of the respective section 122 of the bearing 100, such that the bearing pad 106 and housing 110 of the respective section 122 are fabricated to form a single integral part. Moreover, in certain embodiments, a plurality of bearing pads 106 and respective portions of the housing 110 forming two or more sections 122 may be formed integrally, or further still, each of the plurality of bearing pads 106 and respective portions of the housing 110 forming the bearing 100 may be formed integrally.

The bearing pads 106 and housing 110 may be fabricated via any technique suitable to facilitate forming the integral part depicted and described below. For example, in some embodiments, the bearing pads 106 and the housing 110 may be fabricated using an additive manufacturing process (also known as rapid prototyping, rapid manufacturing, and 3D printing), such as selective laser sintering (SLS), direct metal laser sintering (DMLS), electron beam melting (EBM), diffusion bonding, or selective heat sintering (SHS). It should be appreciated, however, that in other embodiments one or more of the bearing sections 122, including a bearing pad 106 and a respective portion of the housing 110, may be formed integrally of a single, continuous material and joined to separately formed, adjacent bearing sections 122 in any other suitable manner, such as through a mechanical fastening means.

Figure 5:
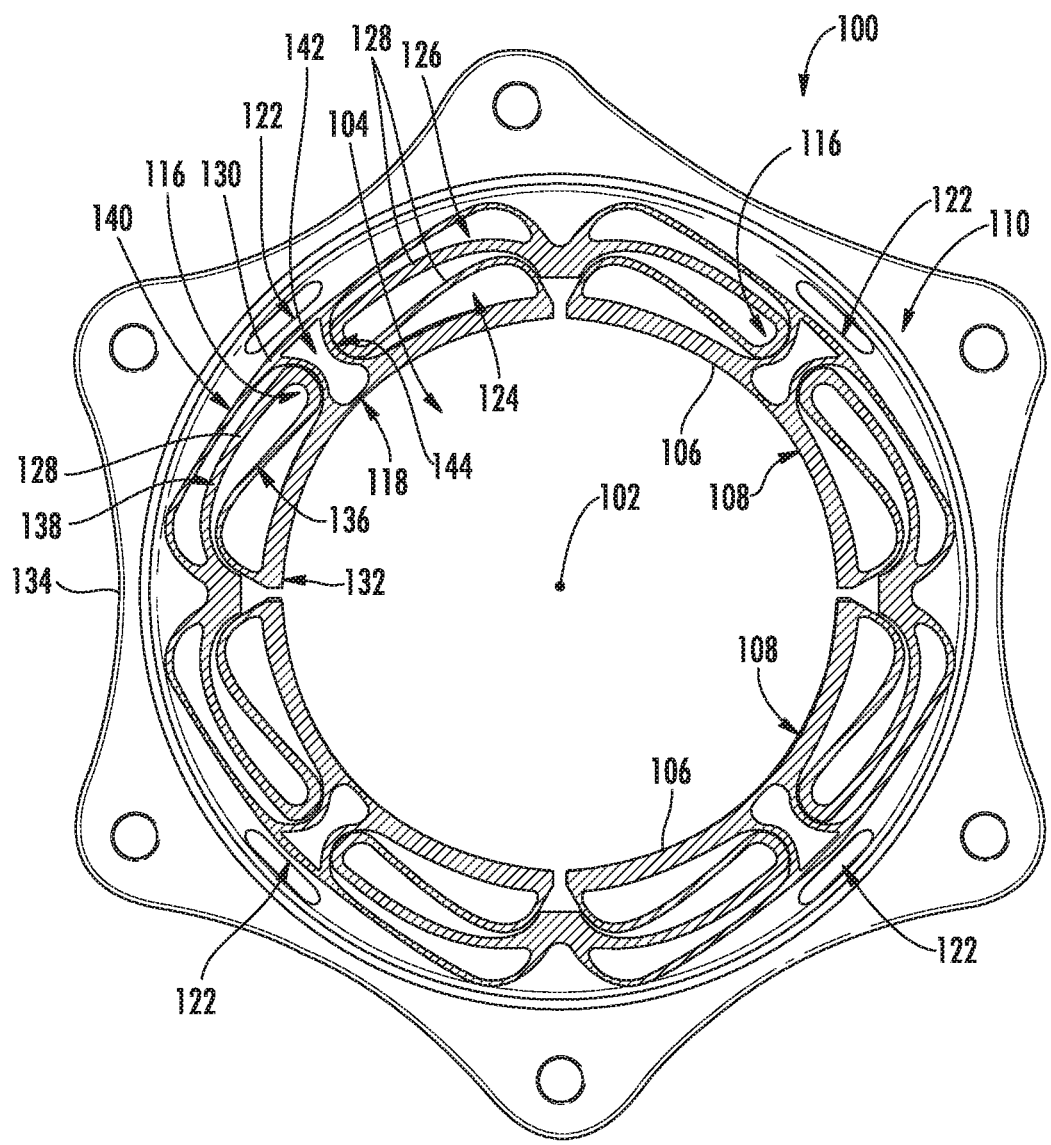
FIG. 5 is a cross-sectional view of the exemplary bearing of FIG. 2, taken along Line 5-5 in FIG. 2.
Figure 6:
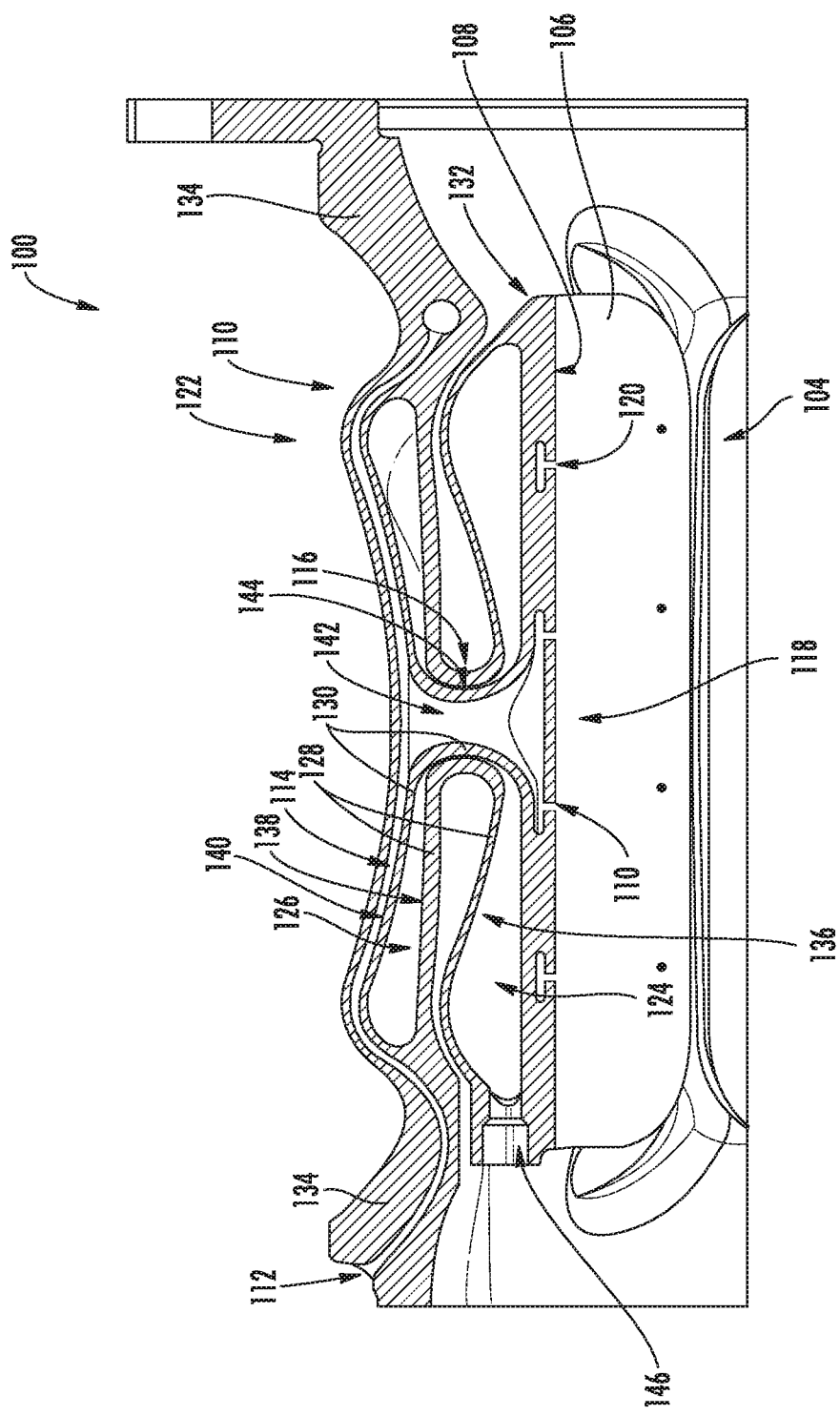
FIG. 6 is a cross-sectional view of the exemplary bearing of FIG. 2, taken along Line 6-6 in FIG. 3.

Referring now particularly to FIG. 4, and now also to FIGS. 5 and 6 providing cross-sectional views of the exemplary bearing 100 (along Line 5-5 in FIG. 2 and along Line 6-6 in FIG. 3, respectively), as briefly noted above each of the bearing sections 122 includes a portion of the housing 110 configured as a damper assembly. More particularly, for the embodiment depicted, the housing 110 at least partially defines a first fluid damper cavity 124 and a second fluid damper cavity 126. For the embodiment depicted, the first fluid damper cavity 124 and the second fluid damper cavity 126 each extend three hundred and sixty degrees (360°) around the column 116. Additionally, the first fluid damper cavity 124 is positioned adjacent to the bearing pad 106 and the second fluid damper cavity 126 is spaced from the first fluid damper cavity 124, or more particularly, is spaced from the first fluid damper cavity 124 along the radial direction R2.

For the embodiment depicted, the portion of the housing 110 configured as a damper assembly for each bearing section 122 generally includes a first, outer wall 128 and a second, inner wall 130. The inner wall 130 and outer wall 128, for the embodiment depicted, are configured as a serpentine inner wall 130 and a serpentine outer wall 128 (i.e., a wall extending in a variety of directions), respectively. For example, the bearing pad 106 generally defines an outer periphery 132. The serpentine outer wall 128 is attached to or formed integrally with the bearing pad 106 proximate the outer periphery 132 of the bearing pad 106 (or rather, at the outer periphery 132 of the bearing pad 106), extends generally towards the center 118 of the bearing pad 106 along the axial direction A2, and subsequently extends back away from the center 118 of the bearing pad 106 along the axial direction A2, connecting with a body 134 of the housing 110. Similarly, for the embodiment depicted, the inner wall 130 is attached to or formed integrally with the bearing pad 106 proximate the center 118 of the bearing pad 106 (or rather, at the center 118 of the bearing pad 106), extends generally away from the bearing pad 106 along the radial direction R2, and subsequently extends away from the center 118 of the bearing pad 106 along the axial direction A2, also connecting with the body 134 of the housing 110.

Further, the outer wall 128 generally includes a semi-rigid portion 136 and a rigid portion 138, and similarly the inner wall 130 includes a semi-rigid portion 140. As is depicted, the outer wall 128 at least partially defines the first fluid damper cavity 124 and at least partially defines the second fluid damper cavity 126. Additionally, the bearing pad 106 at least partially defines the first fluid damper cavity 124, and the inner wall 130 at least partially defines the second fluid damper cavity 126. More particularly, for the embodiment depicted the semi-rigid portion 136 of the outer wall 128 and bearing pad 106 together define the first fluid damper cavity 124, and the rigid portion 138 of the outer wall 128 and semi-rigid portion 140 of the inner wall 130 together define the second fluid damper cavity 126.

It should be appreciated, that as used herein, the terms "semi-rigid" and "rigid" are relative terms. Accordingly, a portion of a component of the bearing 100 described as semi-rigid may be configured to bend, flex, or give way prior to a portion of a component of the bearing 100 described as rigid. For the embodiment depicted, the semi-rigid portions of the various components are created by forming such portions with a lesser thickness as compared to the rigid portions of such components. Further, a component of the bearing 100 described as "semi-rigid" herein refers to a component configured to bend, flex, or give way during normal operation of the bearing 100 while incurring little or no damage.

Additionally, for the embodiment depicted the first fluid damper cavity 124 is in flow communication with the second fluid damper cavity 126 through a portion of the column 116. Specifically, the exemplary column 116 depicted is configured as a double-walled column 116 formed from a portion of the inner wall 130 and a portion of the outer wall 128. Accordingly, the column 116 is supported at a radially outer end by the rigid portion 138 of the outer wall 128 and the semi-rigid portion 140 of the inner wall 130. Further, at a radially inner end the portion of the column 116 formed by the inner wall 130 is attached to the bearing pad 106 (or rather formed integrally with the bearing pad 106), and the portion of the column 116 formed by the outer wall 128 is attached to the bearing pad 106 through the semi-rigid portion 136 of the outer wall 128.

Moreover, the inner wall 130 defines an inner channel 142 for providing the bearing pad 106 with the working gas, and the outer wall 128 and inner wall 130 together define an outer channel 144. As will be appreciated, for the embodiment depicted, the outer channel 144 is concentric with the inner channel 142 and defines a substantially annular shape around the inner channel 142. Further, for the embodiment depicted, the outer channel 144 is configured as a clearance gap, such that the first fluid damper cavity 124 and the second fluid damper cavity 126 are in restrictive flow communication through the outer channel 144.

Further, the first fluid damper cavity 124, second fluid damper cavity 126, and outer channel 144 are all sealed together, and together define a fixed volume. The exemplary housing 110 depicted defines a damper cavity supply 146 (FIG. 6) for filling the first and second fluid damper cavities 124, 126 with a dampening fluid, such that during operation, the first and second fluid damper cavities 124, 126 and outer channel 144 are each completely filled with the dampening fluid. A cap or other removable or permanent closure means may be positioned over the damper cavity supply 146 after the cavities are filled. The dampening fluid may be, e.g., an oil, such as heat transfer oil, or alternatively may be any other suitable fluid, such as any suitable incompressible liquid. The bearing 100 is configured to transfer the damper fluid from the first fluid damper cavity 124, through the outer channel 144/clearance gap, and to the second fluid damper cavity 126 in response to a force acting on the bearing pad 106.

Figure 7:
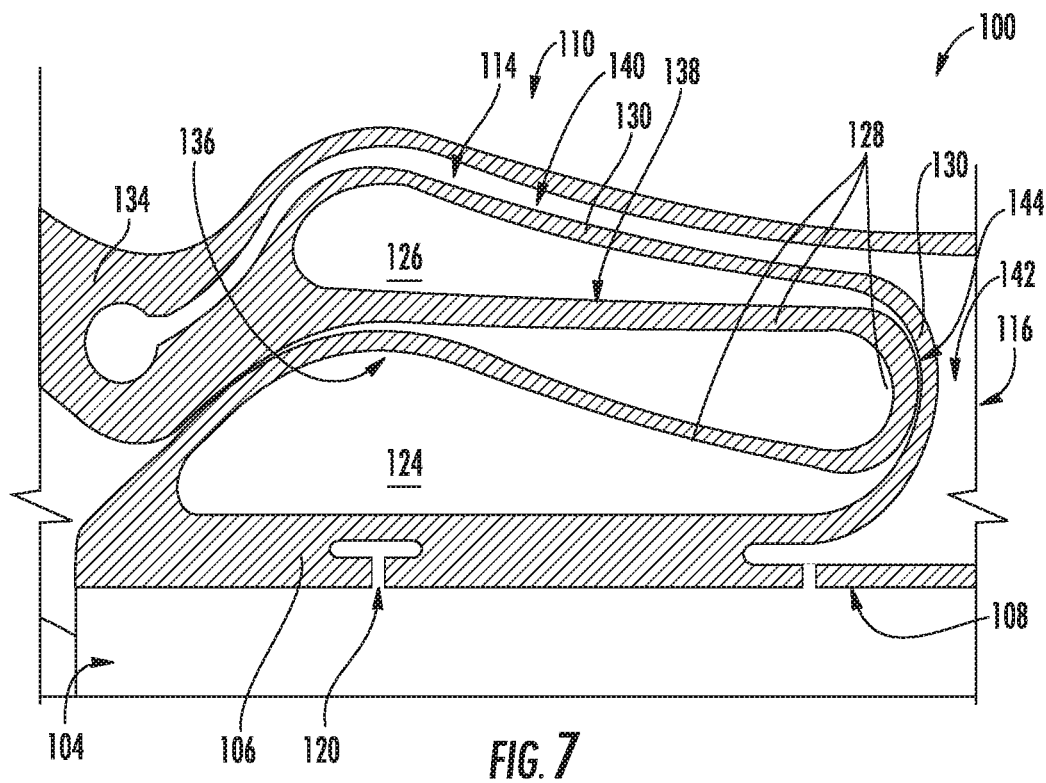
FIG. 7 is a close-up, cross-sectional view of the exemplary bearing of FIG. 2, in a depressed state.
Figure 8:
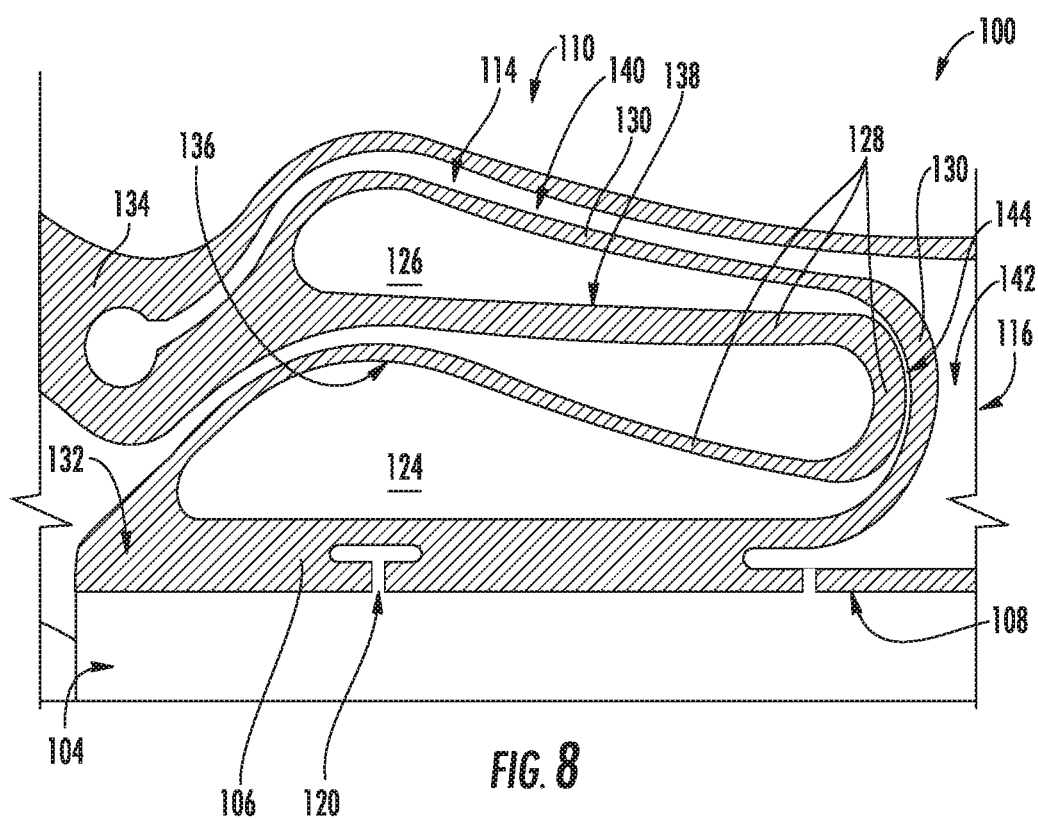
FIG. 8 is a close-up, cross-sectional view of the exemplary bearing of FIG. 2, in an extended state.

More particularly, reference will now be made to FIGS. 7 and 8, providing side, cross-sectional views of a portion of the exemplary bearing 100. FIG. 7 provides a side, close-up, cross-sectional view of the exemplary bearing 100 having absorbed a force acting on the bearing pad 106, and FIG. 8 provides a side, close-up, cross-sectional view of the exemplary bearing 100 without a force acting on the bearing pad 106.

When a force acts on the bearing pad 106, such as when a rotary component supported by the bearing 100 presses on the bearing pad 106 generally along the radial direction R2, the portion of the housing 110 forming the damper assembly allows for the bearing pad 106 to move along the radial direction R2, absorbing such force. More particularly, as the column 116 supporting the bearing pad 106 moves up, the semi-rigid portion 136 of the outer wall 128 partially deforms (decreasing a volume of the first fluid damper cavity 124), a portion of the damping fluid within the first fluid damper cavity 124 is forced through the outer channel 144 of the column 116, configured as a clearance gap, and flows into the second fluid damper cavity 126. At the same time, the rigid portion 138 of the outer wall 128 remains substantially stationary, and the semi-rigid portion 140 of the inner wall 130 partially deforms to increase a volume of the second fluid damper cavity 126 and accept the portion of the dampening fluid provided through the outer channel 144 of the column 116 from the first fluid damper cavity 124. Such movement absorbs the force exerted on the bearing pad 106, and dampens such movement. For example, the relatively tight clearance of the outer channel 144/clearance gap resists relatively quick movement of the bearing pad 106 along the radial direction R2. In the absence of the force exerted on the bearing pad 106, the dampening fluid transferred to the second fluid damper cavity 126 may reverse in flow direction, and flow back through the outer channel 144 of the column 116 to the first fluid damper cavity 124 (FIG. 8).

Figure 9:
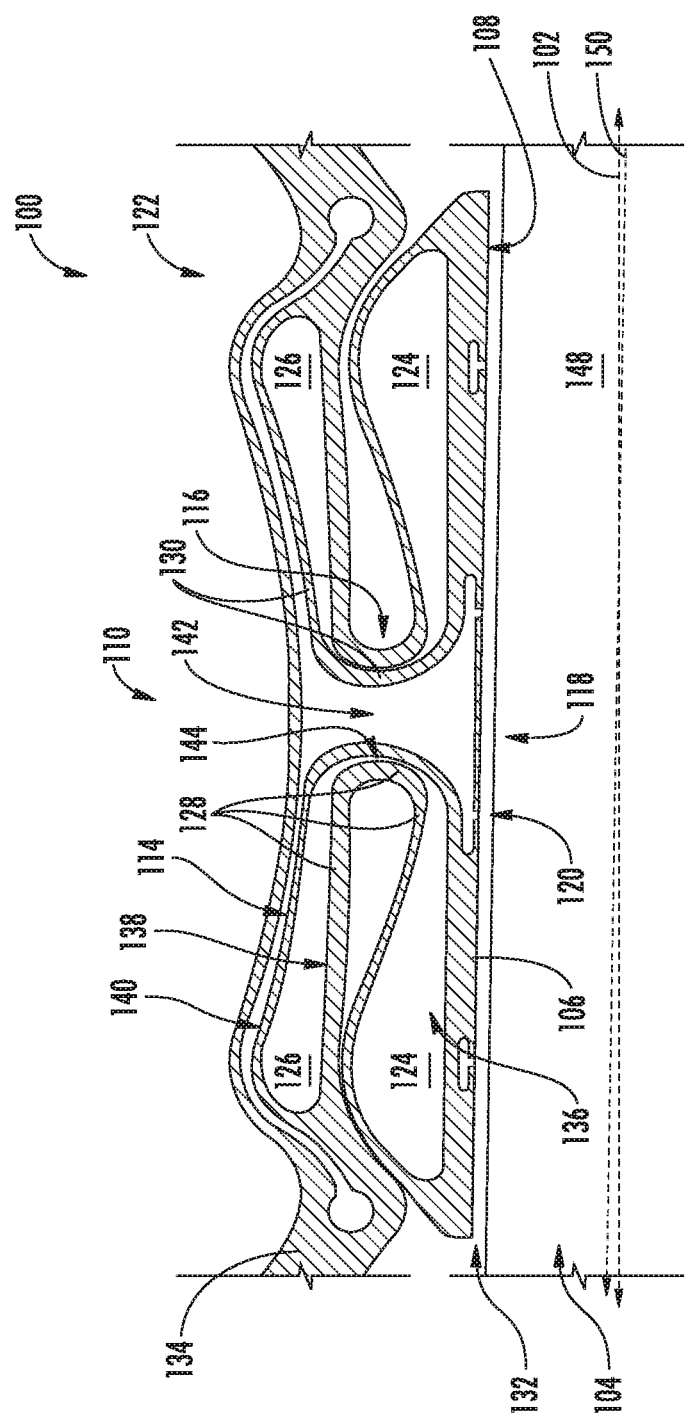
FIG. 9 is a close-up, cross-sectional view of the exemplary bearing of FIG. 2 accommodating and off axis rotary component.

Moreover, referring now to FIG. 9, a side, cross-sectional view is provided depicting a bearing 100 accommodating an off-axis rotation of a rotary component 148. The rotary component 148 depicted may be, e.g., an LP shaft 36 or HP shaft 34 of the turbofan engine 12 of FIG. 1. As is discussed herein, a bearing 100 in accordance with one or more embodiments of the present disclosure may be capable of accommodating a misaligned rotary component 148 or other off axis rotations. More particularly, the exemplary flexible column 116 is configured to support the bearing pad 106 from a location inward of the outer periphery 132 of the bearing pad 106 along the axial direction A2, or for the embodiment depicted from a location proximate the center 118 of the bearing pad 106. Accordingly, a resistive force of the bearing pad 106 along the radial direction R2 is much greater proximate the location from which the column 116 supports the bearing pad 106 as compared to, e.g., the outer periphery 132 of the bearing pad 106. Specifically, a resistance of the bearing pad 106 along the radial direction R2 at the outer periphery 132 is less than a resistance of the bearing pad 106 along the radial direction R2 proximate the location from which the column 116 supports the bearing pad 106. Accordingly, the exemplary flexible column 116 of the bearing 100 is configured to pivot or bend to accommodate misalignment of a central axis 150 of the rotary component 148 with the central axis 102 of the bearing 100. For example, the central axis 150 of the rotary component 148 may define an angle with the central axis 102 of the bearing 100 due to, e.g., improper installation of the bearing 100 or a specific maneuvering of a gas turbine engine into which the bearing 100 is installed. The flexible column 116 of the bearing 100 may flex or pivot to allow for the bearing pad 106 accommodate such misalignment. More specifically, the portions of the inner and/or outer walls 128, 130 forming the column 116 may be configured to flex to accommodate the misalignment. Additionally, or alternatively, the flexible column 116 may pivot to allow the bearing pad 106 to accommodate the misalignment, such that a portion of the inner and/or outer walls 128, 130 supporting the column 116 may flex to allow the column 116 to pivot and accommodate the misalignment.

Furthermore, the inventors have observed that the above described embodiment of the bearing 100 may lead to a reduction in size and weight. Further, the reduction in size and weight of the bearing 100 may further allow the bearing 100 to be utilized in unconventional locations and/or integrations throughout a turbomachine without disrupting an existing cross section, length or architecture of the turbomachine. Such utilization of the bearing 100 may advantageously benefit engine operation due to reduced clearance closures during maneuver of loads, ability to engineer loner rotor bearing systems with additional stages, reduction in dynamic bearing and structural loads, reduction in synchronous vibration response, and improved stability.

Thus, embodiments of a bearing having integrally formed components have been provided herein. In at least some embodiments, the inventive bearing advantageously includes one or more integrated parts, thereby reducing a total number of parts that would otherwise be utilized in conventional gas bearing construction, thus reducing weight, complexity, cost and overall size of the bearing as compared to conventional gas bearings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing defining an axial direction and a radial direction, the bearing comprising:
a bearing pad for supporting a rotary component and defining an outer periphery,
a housing attached to or formed integrally with the bearing pad, the housing comprising a column extending towards the bearing pad for providing the bearing pad with an airflow, the column supporting the bearing pad from a location inward of the outer periphery of the bearing pad along the axial direction;
wherein the column fully supports the bearing pad.

2. The bearing of claim 1, wherein the bearing pad comprises a sintered porous metal selected from the group consisting of cobalt-alloy, nickel-alloy, and iron-alloy.

3. The bearing of claim 1, wherein the bearing pad comprises a sintered porous carbon graphite.

4. The bearing of claim 1, wherein the bearing is adapted to support the rotary component of a turbomachine.

5. The bearing of claim 4, wherein the turbomachine is selected from the group consisting of a steam turbine, a centrifugal compressor, and a turbocharger.

6. The bearing of claim 5, wherein the column supports the bearing pad such that a resistance of the bearing pad along the radial direction at the outer periphery is less than a resistance of the bearing pad along the radial direction proximate the column.

7. The bearing of claim 1, wherein the bearing pad defines a center along the axial direction, and wherein the column is located approximately at the center of the bearing pad along the axial direction.

8. The bearing of claim 7, wherein the bearing pad comprises an inner surface, wherein the inner surface defines one or more openings in airflow communication with the column.

9. The bearing of claim 1, wherein the bearing defines a circumferential direction, wherein the bearing pad defines a center along the circumferential direction, and wherein the column is located approximately at the center of the bearing pad along the circumferential direction.

10. The bearing of claim 9, wherein the bearing pad comprises an inner surface, wherein the inner surface defines one or more openings in airflow communication with the column.

11. The bearing of claim 1, wherein the column is a single column fully supporting the bearing pad.

12. The bearing of claim 1, wherein the column is a flexible column fully supporting the bearing pad.

13. A bearing defining an axial direction and a radial direction, the bearing comprising:
- a bearing pad for supporting a rotary component and defining an outer periphery,
- a housing attached to or formed integrally with the bearing pad, the housing comprising a column extending towards the bearing pad for providing the bearing pad with an airflow, the column supporting the bearing pad from a location inward of the outer periphery of the bearing pad along the axial direction, wherein the column fully supports the bearing pad, and wherein the bearing pad comprises plurality of gas distribution holes.

14. The bearing of claim 13, wherein the plurality of gas distribution holes are disposed across the bearing pad.

15. The bearing of claim 14, wherein the plurality of gas distribution holes are adapted to provide an evenly distributed pressure field to support and/or lubricate the rotary component.

16. The bearing of claim 13, wherein the plurality of gas distribution holes have a diameter of between about 50 micrometers and about 2540 micrometers.

17. The bearing of claim 16, wherein the column supports the bearing pad such that a resistance of the bearing pad along the radial direction at the outer periphery is less than a resistance of the bearing pad along the radial direction proximate the column.

18. The bearing of claim 13, wherein the plurality of gas distribution holes have a diameter of between about 127 micrometers and about 508 micrometers.

19. The bearing of claim 13, wherein the column is a single column fully supporting the bearing pad.

20. The bearing of claim 13, wherein the column is a flexible column fully supporting the bearing pad.

* * * * *